United States Patent
Saito et al.

(10) Patent No.: US 8,320,608 B2
(45) Date of Patent: Nov. 27, 2012

(54) ELECTRONIC SEAL APPARATUS, ELECTRONIC SEAL SYSTEM, AND METHOD FOR CONTROLLING THE ELECTRONIC SEAL APPARATUS

(75) Inventors: Naoki Saito, Ashiya (JP); Yukio Kanaoka, Nara (JP)

(73) Assignee: Sharp Kabushiki Kaisha, Osaka-shi, Osaka (JP)

( * ) Notice: Subject to any disclaimer, the term of this patent is extended or adjusted under 35 U.S.C. 154(b) by 1030 days.

(21) Appl. No.: 12/315,246

(22) Filed: Dec. 1, 2008

(65) Prior Publication Data
US 2009/0141952 A1 Jun. 4, 2009

(30) Foreign Application Priority Data
Dec. 3, 2007 (JP) .................................. 2007-312766

(51) Int. Cl.
*G06K 9/00* (2006.01)
(52) U.S. Cl. ........................................ 382/100; 382/124
(58) Field of Classification Search .................. 382/100, 382/124; 713/186, 170, 176, 180
See application file for complete search history.

(56) References Cited

U.S. PATENT DOCUMENTS

| | | | |
|---|---|---|---|
| 6,828,960 B2 * | 12/2004 | Parry | 345/179 |
| 7,934,098 B1 * | 4/2011 | Hahn et al. | 713/176 |
| 2002/0157003 A1 * | 10/2002 | Beletski | 713/170 |
| 2003/0182151 A1 * | 9/2003 | Taslitz | 705/1 |
| 2005/0229006 A1 * | 10/2005 | De Moura et al. | 713/186 |
| 2009/0031132 A1 * | 1/2009 | Lehwany | 713/176 |

FOREIGN PATENT DOCUMENTS

| | | | |
|---|---|---|---|
| JP | 2001-265915 A | | 9/2001 |
| JP | 2004214792 A | * | 7/2004 |
| JP | 2004-334788 A | | 11/2004 |
| JP | 2004-355112 A | | 12/2004 |
| JP | 2006-179977 | | 7/2006 |
| JP | 2006-209713 | | 8/2006 |
| JP | 2007-304812 A | | 11/2007 |
| JP | 2008-092490 | | 4/2008 |

* cited by examiner

*Primary Examiner* — Jon Chang
(74) *Attorney, Agent, or Firm* — Edwards Wildman Palmer LLP; David G. Conlin; Edmund J. Koundakjian

(57) ABSTRACT

An electronic seal apparatus causing an image displaying/reading apparatus to display an electronic document. The electronic seal apparatus includes (i) a storage section for storing a first identification information of a user's first digit and an associated user's first seal image, (ii) a digit identifying section for determining whether a digit indicated on a subject image is the user's first digit, and (iii) a sealing section for sealing onto the electronic document, when the digit indicated on the subject image is the user's first digit, a seal image associated with the first identification information. Thereby, a seal image can be electronically sealed after finger authentication is performed even if a finger authentication scanner solely dedicated for reading an image from a digit is not provided.

15 Claims, 6 Drawing Sheets

FIG. 5 (a)

APPROVAL DOCUMENT

| PERSON IN CHARGE | MANAGER | GENERAL MANAGER |
|---|---|---|
|  |  |  | xxxxxxxxxxxx

FIG. 5 (b)

APPROVAL DOCUMENT

| PERSON IN CHARGE | MANAGER | GENERAL MANAGER |
|---|---|---|
|  |  |  | xxxxxxxxxxxx

FIG. 5 (c)

APPROVAL DOCUMENT

| PERSON IN CHARGE | MANAGER | GENERAL MANAGER |
|---|---|---|
| 鈴木 |  |  | xxxxxxxxxxxx

ELECTRONIC SEAL APPARATUS, ELECTRONIC SEAL SYSTEM, AND METHOD FOR CONTROLLING THE ELECTRONIC SEAL APPARATUS

This Nonprovisional application claims priority under 35 U.S.C. §119(a) on Patent Application No. 312766/2007 filed in Japan on Dec. 3, 2007, the entire contents of which are hereby incorporated by reference.

FIELD OF THE INVENTION

The present invention relates to an electronic seal system for making an electronic seal of a user's seal image onto an electronic document displayed on a display apparatus.

BACKGROUND OF THE INVENTION

In a case where an electronic document displayed on a personal computer (hereinafter, referred to as "PC") is to be sealed (that is, to form a seal image), it was necessary to print out the electronic document, stamp a seal impression onto a document thus printed out, and then, scan in by a scanner the document having the seal impression thus stamped, so as to convert the document into an electronic document again. However, development of software capable of carrying out a process of adding a user's seal image onto an electronic document displayed on a PC (i.e., electronic seal software) made it possible to directly add, by operating a keyboard and mouse of a PC, a pre-registered seal image onto a displayed electronic document, without printing out the electronic document in order to stamp the seal impression thereon.
[Patent Document 1]
Japanese Unexamined Patent Publication No. 2006-209713
  (Tokukai 2006-209713, publication date: Aug. 10, 2006)
[Patent Document 2]
Japanese Unexamined Patent Publication No. 2006-179977
  (Tokukai 2006-179977, publication date: Jul. 6, 2006)

In a system utilizing electronic seal software, it is understandably necessary to prevent a fraud in which an unauthorized person operates the system in order to add a seal image of a person other than the unauthorized person onto an electronic document without permission. Therefore, user authentication should be performed before a process of sealing. The user authentication is reliably performed by finger authentication in which a feature of a user's digit (a fingerprint, a vein pattern, etc.) is verified.

In order to perform finger authentication in a system utilizing electronic seal software, it is necessary to externally attach to a PC a finger authentication scanner solely dedicated for reading an image from a digit, or, it is necessary to use a notebook PC having a built-in finger authentication scanner solely dedicated for reading an image from a digit. In view of this, there is a demand for a system in which electronic sealing can be performed after finger authentication is performed without a finger authentication scanner or a notebook PC having a built-in finger authentication scanner.

SUMMARY OF THE INVENTION

An object of the present invention is to makes it possible to perform pre-sealing finger authentication without a finger authentication scanner solely dedicated for reading an image from a digit, in an electronic seal system for sealing a seal image onto an electronic document.

An electronic seal apparatus of the present invention includes: a controlling section for (i) controlling an image displaying/reading apparatus having a function of displaying an image on a display panel by using display elements arrayed in a plane direction and a function of reading, by using reading elements arrayed in a plane direction, a subject image of a subject being placed in contact with the display panel, and (ii) sealing a seal image onto an electronic document displayed on the display panel; and a storage section for storing (i) first identification information to be used for identifying a first digit of a user of the image displaying/reading apparatus and (ii) a first seal image of the user in association with the first identification information, the controlling section including: a digit identifying section for determining based on the first identification information whether or not a digit indicated on the subject image that is read while the electronic document is displayed is the first digit; and a sealing section for sealing, in a case where the digit identifying section determines that the digit indicated on the subject image is the first digit, the first seal image onto the electronic document displayed on the display panel, the first seal image being associated with the first identification information.

According to the arrangement of the present invention, information indicative of a user's digit (a fingerprint image, a vein pattern image, etc.) can be inputted from the image displaying/reading apparatus. This makes it possible to electronically seal a seal image after finger authentication is performed even if a finger authentication scanner solely dedicated for reading an image from a digit is not provided.

Additional objects, features, and strengths of the present invention will be made clear by the description below. Further, the advantages of the present invention will be evident from the following explanation in reference to the drawings.

BRIEF DESCRIPTION OF THE DRAWINGS

FIG. 5(a) is a schematic view illustrating an approval document (an electronic document) of the embodiment. FIG. 5(b) is a schematic view illustrating a situation in which a user places a digit on a seal field on the approval document. FIG. 5(c) is a schematic view illustrating the approval document having a sealed seal image in the seal field.

DESCRIPTION OF THE EMBODIMENTS

Figure 1:
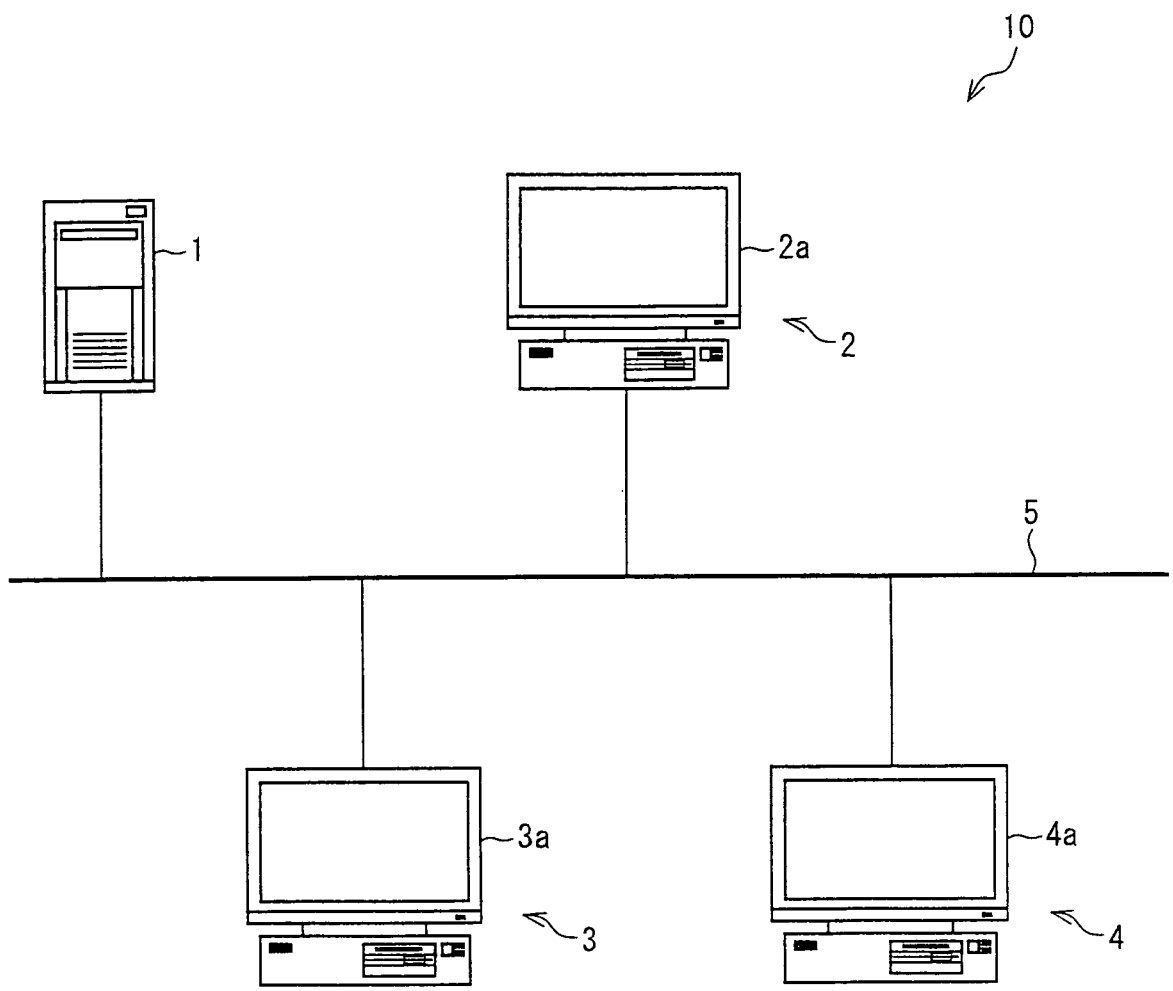
FIG. 1 is a schematic view illustrating an overall arrangement of an electronic seal system of an embodiment of the present invention.

The following describes an electronic seal system of an embodiment of the present invention, with reference to drawings. FIG. 1 is an explanatory view illustrating a schematic arrangement of the electronic seal system of the present embodiment.

An electronic seal system 10 is a network system that allows a worker in an office to prepare an approval document (an electronic document) and seals an electronic seal onto the approval document. As illustrated in FIG. 1, the electronic seal system 10 includes an administrative server 1, terminals 2, 3, and 4, and a communications network 5. As illustrated in FIG. 1, the administrative server 1 and the terminals 2, 3, and 4 are connected to the communications network 5 so as to communicate with each other via the communications network 5.

The terminals 2, 3, and 4 are PCs each installed with various software such as an OS (Operating System), word-processing software, spreadsheet software, drawing software, image editing software, and/or the like. Assume that, in the present embodiment, each of users belongs to any one of the three job grade (job title) groups: a "person in charge" group, a "manager" group, and a "general manager" group. That is, it is assumed that a user of the terminal 2 belongs to the person in charge group (a group of employees with no title); a user of the terminal 3 belongs to the manager group; a user of the terminal 4 belongs to the general manager group.

As a displaying means for displaying an image to a user, each of the terminals 2, 3, and 4 has an input display (hereinafter, referred to as "image displaying/reading apparatus") as described in Patent Document 2. In FIG. 1, an image displaying/reading apparatus of the terminal 2 is represented by 2a; an image displaying/reading apparatus of the terminal 3 is represented by 3a; an image displaying/reading apparatus of the terminal 4 is represented by 4a.

Each of the image displaying/reading apparatuses 2a through 4a has a liquid crystal display panel (a display screen), a plurality of display elements (TFT or FET) that are two-dimensionally (i.e., in a plane direction) arrayed in the liquid crystal display panel, and a plurality of reading elements (photodiodes) that are two-dimensionally (i.e., in a plane direction) arrayed in the liquid crystal display panel. Each of the image displaying/reading apparatuses 2a through 4a has a function of displaying an image on the liquid crystal display panel by the display elements and a function of reading an image of a subject by the reading elements, the subject externally touching the liquid crystal display panel. Hereinafter, a subject image read by each of the image displaying/reading apparatuses 2a through 4a is referred to as "subject image." The plane direction means a direction that is parallel to the display screen.

The administrative server 1 is one embodiment of an authenticating apparatus of the present invention. The administrative server 1 is a computer that performs overall control on the terminals 2 through 4, namely, a computer that can control each of the image displaying/reading apparatuses 2a through 4a. The following describes the administrative server 1 in detail.

Figure 2:
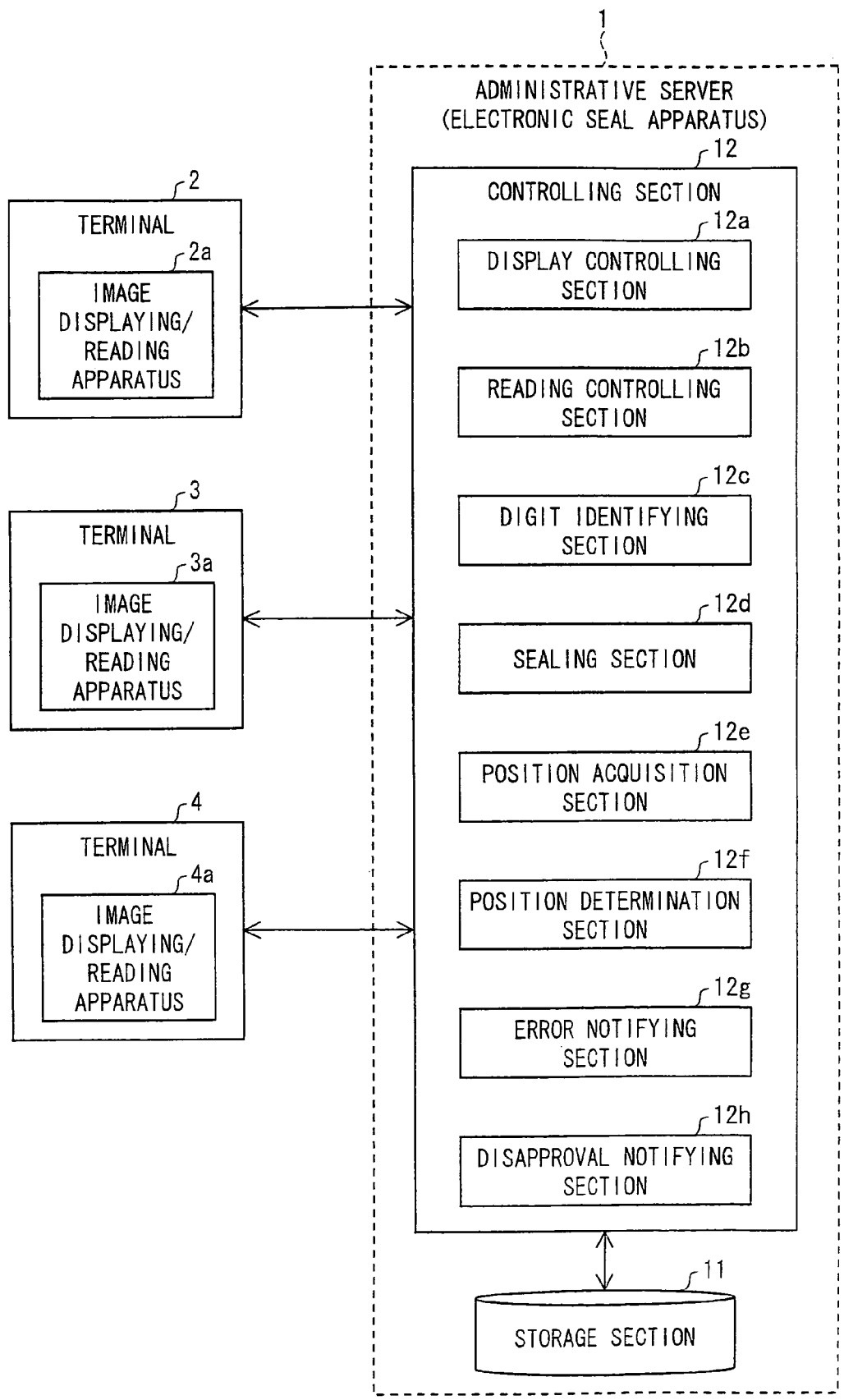
FIG. 2 is a block diagram illustrating a detailed arrangement of an administrative server (an electronic seal apparatus), which is a component of the electronic seal system illustrated in FIG. 1.

FIG. 2 is a block diagram illustrating the administrative server 1. As illustrated in FIG. 2, the administrative server 1 includes a storage section 11 and a controlling section 12.

The storage section 11 stores, for each of users of the terminals 2 through 4, first fingerprint information, a seal image of the user, and job grade information in association with each other. The first fingerprint information (first identification information) indicates a fingerprint of a middle finger of a user's right hand. The job grade information (group information) indicates a job grade group to which the user belongs. The storage section 11 also stores by each of the users of the terminals 2 through 4 second fingerprint information indicative of a fingerprint of a ring finger of a user's right hand.

The controlling section 12 mainly has: (a) a function as a display controlling section 12a that displays an electronic document respectively on the image displaying/reading apparatuses 2a, 3a, and 4a, (b) a function as a reading controlling section 12b that controls the image displaying/reading apparatuses 2a, 3a, and 4a respectively so that the image displaying/reading apparatuses 2a, 3a, and 4a can continue to read the subject image, respectively, (c) a function as a digit identifying section 12c that determines whether or not (i) a subject image (an image indicating fingerprint) read while a user's fingerprint is in contact with a display screen of each of the image displaying/reading apparatuses 2a, 3a, and 4a matches with (ii) the first fingerprint information stored in the storage section 11, and (d) a function as a sealing section 12d that seals a seal image onto the electronic document in a case where the fingerprint indicated on the subject image matches with the first fingerprint information.

Figure 3:
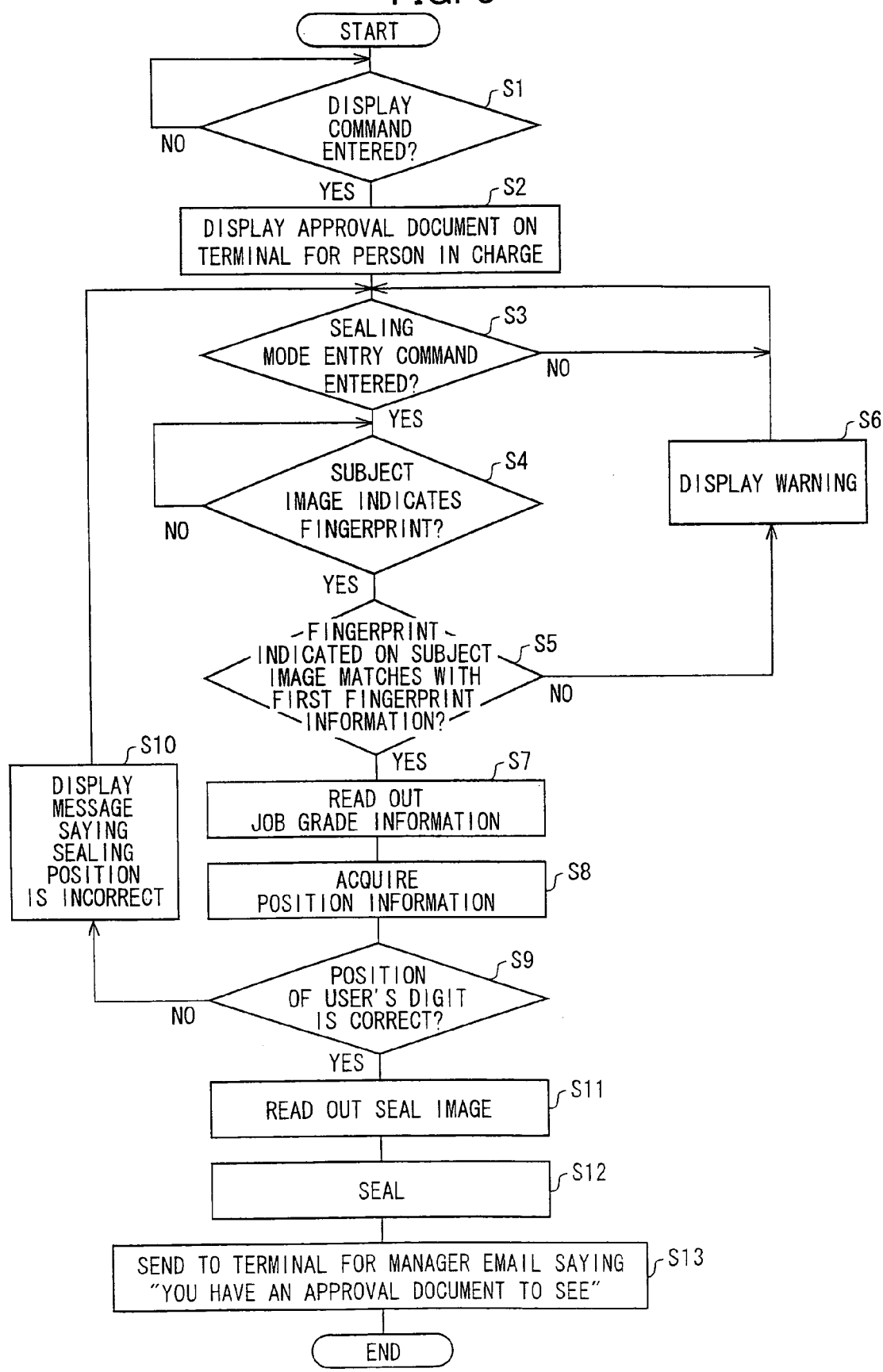
FIG. 3 is a flowchart illustrating a processing flow of a controlling section. In the processing flow, an approval document is prepared on a terminal for a person in charge.

The following describes the details of processes to be carried out by the controlling section 12, with reference to a flowchart illustrated in FIG. 3. The flowchart of FIG. 3 illustrates a processing flow of the controlling section 12, in which processing flow an approval document (an electronic document) is prepared on the terminal 2 for a person in charge.

First, the user of the terminal 2 enters into the terminal 2 a display command for displaying an approval document. The display command is transmitted from the terminal 2 to the controlling section 12 in the administrative server 1. Upon the receipt of the display command (YES at S1), the controlling section 12 displays the approval document on the display screen of the image displaying/reading apparatus 2a of the terminal 2 (S2). The approval document of the present embodiment is an electronic document and, as illustrated in FIG. 5(a), has seal fields for a person in charge, a manager, and a general manager.

Then, by operating the terminal 2, the user of the terminal 2 enters letters etc. in the approval document displayed on the image displaying/reading apparatus 2a. The approval document is thus prepared.

Then, the user of the terminal 2 enters into the terminal 2 a sealing mode entry command for causing the controlling section 12 to enter a sealing mode (a mode for performing electronic sealing). The sealing mode entry command is transmitted from the terminal 2 to the controlling section 12. Upon the receipt of the sealing mode entry command, the controlling section 12 enters the sealing mode (YES at S3).

After the entry into the sealing mode, the controlling section 12 controls the image displaying/reading apparatus 2a so that the image displaying/reading apparatus 2a continues to read a subject image of a subject placed on the display screen of the image displaying/reading apparatus 2a. In such a way, the controlling section 12 causes the image displaying/reading apparatus 2a to continue to read the subject image until the subject image indicates a fingerprint (NO at S4).

After the controlling section 12 is putted into the sealing mode by the user, the user places a middle finger of the right hand on (or in front of) a seal field for the job grade of the user on the approval document displayed on the display screen of the displaying/reading apparatus 2a. Since the job grade of the user of the terminal 2 is person in charge, as illustrated in FIG. 5(b), the user puts the middle finger of the right hand on the seal field for a person in charge.

This allows the controlling section 12 to detect a fingerprint contained in the subject image (YES at S4). The controlling section 12 then determines whether or not each of all the pieces of the first fingerprint information matches with the fingerprint indicated on the subject image (S5). In a case where a piece of the first fingerprint information matches with the fingerprint indicated on the subject image, the controlling section 12 advances the process to S7. In a case where none of the first fingerprint information matches with the fingerprint, the controlling section 12 advances the process to S6. In short, the controlling section 12 determines whether or not the fingerprint in the subject image is the fingerprint indicated by the first fingerprint information (i.e., a fingerprint of an authorized user).

In the present embodiment, a fingerprint indicated on a subject image is a fingerprint of the middle finger of the right hand of the user of the terminal 2. The storage section 11 stores the first fingerprint information indicative of the fingerprint of the middle finger of the right hand of the user of the terminal 2. Accordingly, the controlling section 12 determines that the first fingerprint information matches with the fingerprint indicated on the subject image. Therefore, the controlling section 12 advances the process to S7.

If none of the first fingerprint information matches with the fingerprint indicated on the subject image (NO at S5), the controlling section 12 recognizes the user operating the terminal 2 as an unauthorized person. Therefore, the controlling section 12 causes the image displaying/reading apparatus 2a to display a warning (S6). After displaying the warning at S7, the controlling section 12 returns the process to S3 (i.e., to a state prior to the entry to the sealing mode).

After the first fingerprint information is determined to match with the fingerprint indicated on the subject image (YES at S5), the controlling section 12 reads out job grade information indicative of a job grade of the user of the terminal 2 from the storage section 11 (S7). Specifically, the controlling section 12 reads out the job grade information associated with that piece of the first fingerprint information which matches with the fingerprint indicated on the subject image.

Then, the controlling section 12 obtains, based on the subject image, position information indicative of a contact (facing) position between the approval document displayed on the display screen of the image displaying/reading apparatus 2a and the digit of the user (S8).

Based on the job grade information read out at S7 and the position information obtained at S8, the controlling section 12 determines whether or not the digit of the user of the terminal 2 is placed on (or in front of) the seal field for the job grade of the user (S9). In a case where the controlling section 12 determines that the digit is placed on the seal field, the controlling section 12 advances the process to S11, otherwise advances the process to S10. That is, the controlling section 12 determines at S9 whether or not a position of a user's digit is appropriate.

In the present embodiment, a job grade of the user of the terminal 2 is person in charge. Accordingly, as illustrated in FIG. 5(b), the digit of the user of the terminal 2 is placed on the seal field for a person in charge on the approval document. Therefore, the controlling section 12 determines that the digit of the user of the terminal 2 is placed on the seal field for the job grade of the user (YES at S9). Accordingly, the controlling section 12 advances the process to S9.

If the digit of the user of the terminal 2 is not placed on the seal field for the job grade of the user (NO at S9), the controlling section 12 causes the image displaying/reading apparatus 2a to display a message that the sealing position is incorrect (S10). After displaying the message at S10, the controlling section 12 returns the process to S3 (i.e., to a state prior to the entry to the sealing mode).

After determining that the digit of the user of the terminal 2 is placed on the seal field for the job grade of the user (YES at S9), the controlling section 12 reads out a seal image of the user of the terminal 2 from the storage section 11 (S11). Specifically, the controlling section 12 reads out from the storage section 11 a seal image associated with that piece of the first fingerprint information which matches with the fingerprint indicated on the subject image.

After S11, the controlling section 12 carries out a process of sealing (performing electronic sealing of) the seal image read out at S11 onto the approval document displayed on the image displaying/reading apparatus 2a (S12). As a result, as illustrated in FIG. 5(b) and FIG. 5(c), the seal image of the user is displayed in the seal field indicated by the user's digit placed thereon.

Then, the controlling section 12 sends an email saying "You have an approval document to see" to the terminal 3 which is a terminal for a manager who has a vote to approve or disapprove the approval document thus prepared (S13). Then, the controlling section 12 terminates the process.

In the electronic seal system 10 above, a user place a middle finger of a right hand on or (in front of) a seal field on an approval document (an electronic document) displayed on the displaying/reading apparatus 2a. As a result, a seal image of the user is sealed onto the seal field. As such, a user can simultaneously perform inputting of a fingerprint and designation of a sealing position, in a system that does not permit a user to seal an electronic seal unless a fingerprint of the user is inputted. That is, the electronic seal system of the present embodiment saves more labor as compared to a conventional electronic seal system in which inputting of a fingerprint is performed by placing a digit on a reading surface of a scanner and designation of a sealing position is performed by operation via a keyboard (or a mouse).

Figure 4:
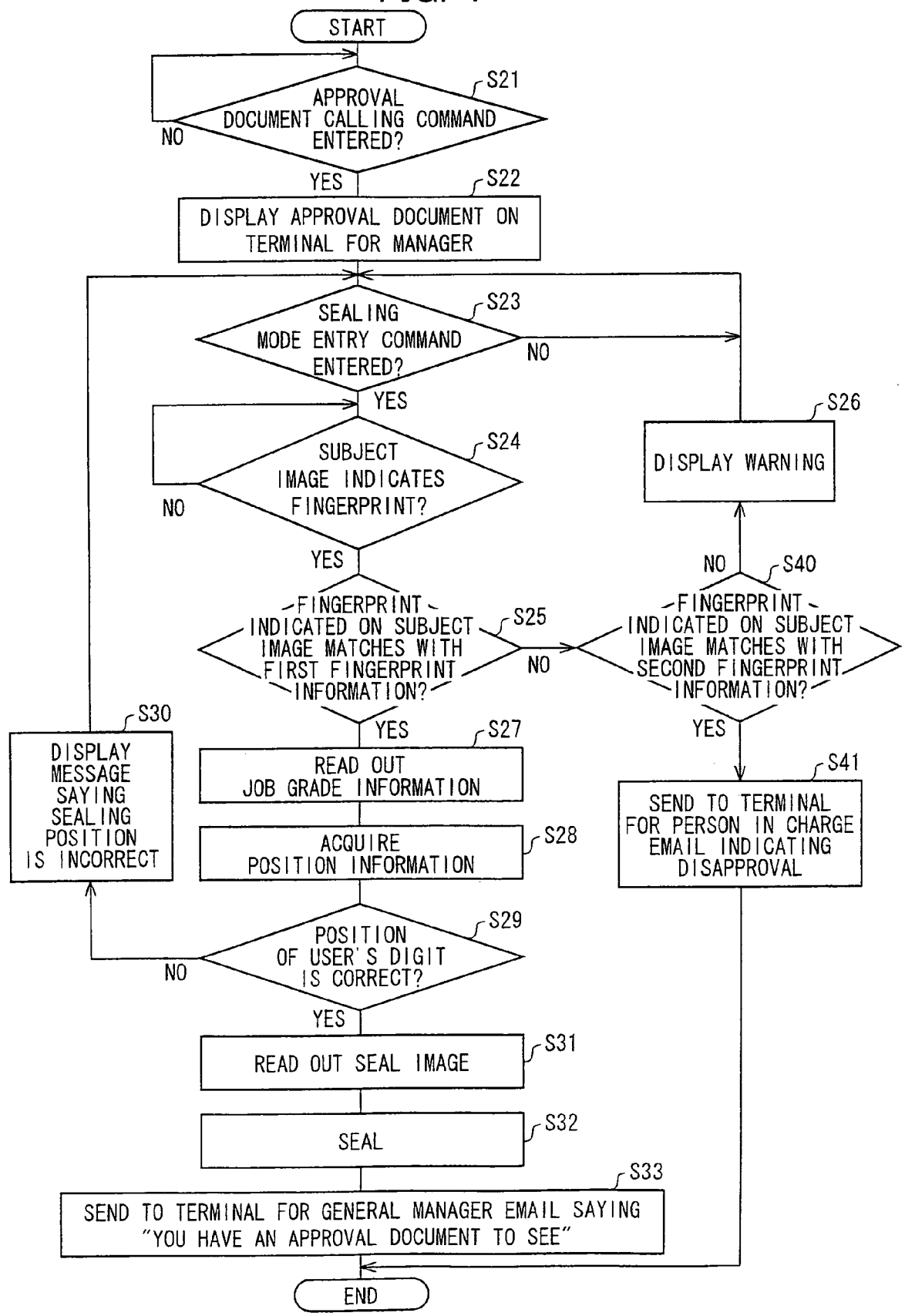
FIG. 4 is a flowchart illustrating a processing flow of the controlling section. In the processing flow, the approval document is approved or disapproved on a terminal for a manager.

The following describes a processing flow in which the approval document is approved or disapproved on a terminal 3 (a terminal for a manager) that has received an email saying "You have an approval document to see." A flowchart of FIG. 4 is a flowchart illustrating a processing flow in which an approval document is approved or disapproved on the terminal 3 for a manager. Since many steps in the flowchart of FIG. 4 are the same as those illustrated in FIG. 3, descriptions are omitted for the steps. The following describes steps other than those illustrated in FIG. 3.

By receiving an email sent at S13 of FIG. 3, a user of the terminal 3 notices that there is an approval document that waits for his/her decision on approval, and enters into the terminal 3 an approval document calling command for calling an approval document. The approval document calling command is transmitted from the terminal 3 to the controlling section 12 in the administrative server 1. Upon the receipt of the approval document calling command (YES at S21), the controlling section 12 causes an image displaying/reading apparatus 3a of the terminal 3 to display on the display screen thereof the approval document having the seal image sealed at S12. (S22) That is, the approval document having the seal image sealed in the seal field for a person in charge (i.e., the approval document illustrated in FIG. 5(c)) is displayed on the image displaying/reading apparatus 3a.

After S22, S23 through S25 are carried out. S23 through S25 are the same as S3 through S5 in FIG. 3, respectively. In the case of YES at S25, S27 through S33 are carried out. S27 through S33 are the same as S7 through S13 in FIG. 3, respectively. Therefore, descriptions for S23 through S25 and descriptions for S27 through S33 are omitted.

A difference between FIG. 4 and FIG. 3 is that, in the case of NO at S25 of FIG. 4 (A corresponding process is S5 of FIG.

3), S40 of FIG. 4 is carried out. Therefore, the following deals with details of the case of NO at S25 of FIG. 4.

When none of the first fingerprint information matches with a fingerprint indicated on a subject image at S25, the controlling section 12 determines whether or not each of all the pieces of the second fingerprint information stored in the storage section 11 matches with the fingerprint indicated on the subject image (S40). In a case where a piece of the second fingerprint information matches with the fingerprint indicated on the subject image, the controlling section 12 advances the process to S41. In a case where none of the second fingerprint information matches with the fingerprint indicated on the subject image, the controlling section 12 advances the process to S26.

The second fingerprint information is indicative of a fingerprint of a ring finger of a user's right hand. As such, in a case where the user places the ring finger of the right hand on the display screen of the image displaying/reading apparatus 3a, the second fingerprint information matches with the fingerprint indicated on the subject image.

In a case where the second fingerprint information matches with the fingerprint indicated on the subject image (YES at S40), the controlling section 12 sends an email saying "The approval document was disapproved" to the terminal 2 of the person in charge (S41). As a result, the person in charge realizes that the approval document was disapproved.

If none of the second fingerprint information matches with the fingerprint indicated on the subject image at S40, the controlling section 12 recognizes the user operating the terminal 3 as an unauthorized person. Accordingly, the controlling section 12 causes the image displaying/reading apparatus 3a to display a warning (S26). After displaying the warning at S26, the controlling section 12 returns the process to S23 (i.e., to a state prior to the entry to the sealing mode).

According to the process illustrated in FIG. 4, a manager (the user of the terminal 3) who has a vote to approve or disapprove the approval document can seal his own seal image in the seal field for a manager (S32) by placing a middle finger of a right hand of the manager on (or in front of) the seal field for a manager on an approval document (an electronic document) displayed by the image displaying/reading apparatus 3a. Thus, the manager can approve to the approval document. Alternatively, by placing a ring finger of the manager's right hand on (or in front of) the approval document displayed by the image displaying/reading apparatus 3a, the manager can notify the person in charge of disapproval (S41). As such, in order to switch between entering of a sealing execution command for giving approval and entering of an execution command of a disapproval notification process, a person who gives approval or disapproval merely switches digits (a middle finger/a ring finger) to be placed on the display screen of the image displaying/reading apparatus 3a. As a result, the present embodiment makes it possible to save more labor as compared to an arrangement that requires a user to operate a keyboard to enter these commands.

As described above, the administrative server (an electronic seal apparatus) 1 of the present embodiment includes the storage section 11 for storing in advance (i) the first fingerprint information (the first identification information) to be used for identifying a fingerprint of a middle finger (a first digit) of a user's right hand and (ii) a seal image of the user (a first seal image), in association with each other. The controlling section 12 in the administrative server 1 has (i) a function as a display controlling section 12a that displays an electronic document on the display panel of the image displaying/reading apparatus 2a, (ii) a function as a digit identifying section 12c that determines based on the first fingerprint information, in a case where a fingerprint is indicated on a subject image that is read while the electronic document is displayed, whether or not the fingerprint indicated on the subject image is a fingerprint of a middle finger of a user's right hand, and (iii) a function as the sealing section 12d that seals onto the electronic document, in a case where the fingerprint indicated on the subject image is the fingerprint of the middle finger of the user's right hand, the first seal image associated with the first fingerprint information. The administrative server 1 above allows a user to input his fingerprint from the image displaying/reading apparatus 2a. This makes it possible to electronically seal a seal image after finger authentication is performed even if a finger authentication scanner solely dedicated for reading an image from a digit is not provided.

According to the embodiment, as illustrated in FIG. 2, the controlling section 12 has (i) a function as a position acquisition section 12e that acquires, in a case where a fingerprint is indicated on a subject image, position information indicative of a contact point between an approval document displayed on the display screen of the image displaying/reading apparatus 2a and a digit of a user, and (ii) a function as the sealing section 12d that seals a seal image in that position on the electronic document displayed on the display screen which is indicated by the position information. As such, when a user places a middle finger of the user's right hand on (or in front of) the display screen of the image displaying/reading apparatus 2a as illustrated in FIG. 5(b) and FIG. 5(c), a seal image of the user is sealed in a contact (facing) point between an electronic document displayed on the display screen and the middle finger of the right hand. According to the present embodiment, as such, both inputting of a fingerprint and designation of a sealing position are performed by placing a digit on a display screen. As such, a user can simultaneously perform inputting of a fingerprint and designation of a sealing position, in a system that does not permit a user to electronically seal a seal image unless a fingerprint of the user is inputted. That is, the electronic seal system of the present embodiment saves more labor as compared to a conventional electronic seal system in which inputting of a fingerprint is performed by placing a digit on a reading surface of a scanner and designation of a sealing position is performed by operation via a keyboard (or a mouse).

According to the embodiment above, as illustrated in FIG. 2, the controlling section 12 has (i) a function as a position determination section 12f that determines whether or not a position of a seal field on an approval document displayed on the display screen matches with a position indicated by the position information, and (ii) a function as the sealing section 12d that seals a seal image in a case where the position of the seal field matches with the position indicated by the position information. As such, according to the arrangement of the present embodiment, a seal image is always sealed within a seal field. This eliminates an undesired situation in which a seal image is sealed outside a seal field.

According to the embodiment above, as illustrated in FIG. 2, the controlling section 12 has a function as an error notifying section 12g that notifies a user, in a case where it is determined that a position of a seal field does not match with a position indicated by the position information, that a sealing position is incorrect. This makes it possible to notify a user placing a digit on a position outside a seal field on a display screen of an image displaying/reading apparatus that a seal image is not sealed because the digit is placed on an incorrect position.

The controlling section 12 carries out at S9 a process of determining based on the job grade information read out at S7 and the position information acquired at S8 whether or not the digit of the user of the terminal 2 is placed on (or in front of) the seal field for the job grade of the user. The following describes procedures of the determination in more detail. First, the controlling section 12 (a group determination section) determines based on the job grade information (group information) read out at S7 whether or not the user belongs to the person in charge group (S9a). In a case where the group determination section determines that the user belongs to the person in charge group, the controlling section 12 (the position determination section) determines whether or not a position of a seal field for a person in charge (i.e., a specific seal field) matches with a position indicated by the position information (S9b). S9 is thus carried out. A seal image is sealed in the seal field for a person in charge only if the controlling section 12 (the position determination section) determines at S9 that the position of the seal field for a person in charge matches with the position indicated by the position information (S10). According to the procedures, only a seal image of a person in charge is sealed in the seal field for a person in charge (i.e., a specific seal field). Accordingly, a seal image of a person other than the person in charge (such as a seal image of a manager) cannot be formed by mistake in the seal field for a person in charge.

The controlling section 12 (a warning section) may notify a user of a warning in a case where the controlling section determines at S9a that the user does not belong to the person in charge group and determines at S10 that the position of the seal field for a person in charge matches with the position indicated by the position information, although this is not described in the embodiment above. In a case where, for example, a user who does not belong to the person in charge group places a digit on the seal field for a person in charge, according to the arrangement, it is possible to notify the user that a seal image cannot be sealed in the seal field for a person in charge because the user is not a person in charge. The notification of the warning can be performed by causing the image displaying/reading apparatus 2a used by the user to display the warning.

The approval document of the present embodiment has the seal field for a person in charge (a first specific seal field) and, in addition, the seal field for a manager (a second specific seal field). As such, the controlling section 12 may have a function as a sealing prohibition section that prohibits sealing a seal image in the seal field for a manager until a seal image is sealed in the seal field for a person in charge. With this arrangement, a manager cannot electronically seal a seal image in the seal field for a manager while no seal image is sealed in the seal field for a person in charge. This makes it possible to avoid an undesired situation in which an upper-level worker (a manager) seals by mistake his seal image onto an approval document before a lower-level worker (a person in charge) seals his seal image onto the approval document. (In decision making based on an approval document inside an organization, generally, a lower-level worker seals his seal image onto the approval document before an upper-level worker seals his seal image thereon.)

In the present embodiment, after a seal image is sealed in the seal field for a person in charge on an approval document displayed on the image displaying/reading apparatus 2a (a first image displaying/reading apparatus) that is used exclusively for users of the person in charge group (a first specific group), the controlling section 12 (the display controlling section) starts to display, on the image displaying/reading apparatus 3a (a second image displaying/reading apparatus) that is used exclusively for users of the manager group (a second specific group), the approval document having the seal image sealed in the seal field for a person in charge. This makes it possible to display an electronic document to each of users in a predetermined order in which each of the users seals his seal image.

The storage section 11 stores the second fingerprint information (second identification information) which is used to identify a fingerprint of a ring finger (a second digit) of a right hand of a user. As illustrated in FIG. 2, the controlling section 12 has (i) a function as the digit identifying section 12c that determines based on the second fingerprint information, in a case where a fingerprint is indicated on the subject image, whether or not the fingerprint indicated on the subject image is the fingerprint of the ring finger of the user's right hand, and (ii) a function as a disapproval notifying section 12h that notifies via an email an originator of the electronic document disapproval of the electronic document in a case where the fingerprint indicated on the subject image is the fingerprint of the ring finger of the user's right hand. As such, in order to switch between entering of a sealing execution command for giving approval and entering of an execution command of a disapproval notification process, a person who gives approval or disapproval merely switches digits (a middle finger/a ring finger) to be placed on the display screen of the image displaying/reading apparatus 3a. As a result, the electronic seal system 10 of the present embodiment makes it possible to save more labor as compared to a conventional system that requires a user to operate a keyboard to enter these commands.

Figure 6:
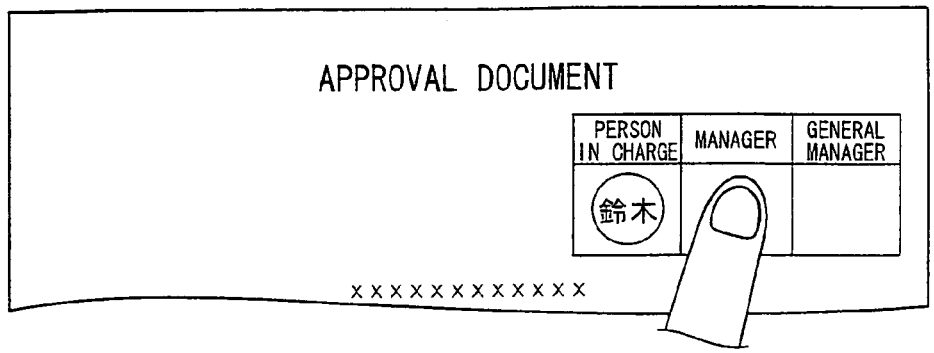
FIG. 6(a) is a schematic view illustrating a situation in which a user places a digit slanting to the right on a display panel.
FIG. 6(b) is a schematic view illustrating a situation in which a sealed seal image has a slant to the right.
FIG. 6(c) is a schematic view illustrating a situation in which a user places a digit slanting to the left on a display panel.
FIG. 6(d) is a schematic view illustrating a situation in which a sealed seal image has a slant to the left.
Figure 6:
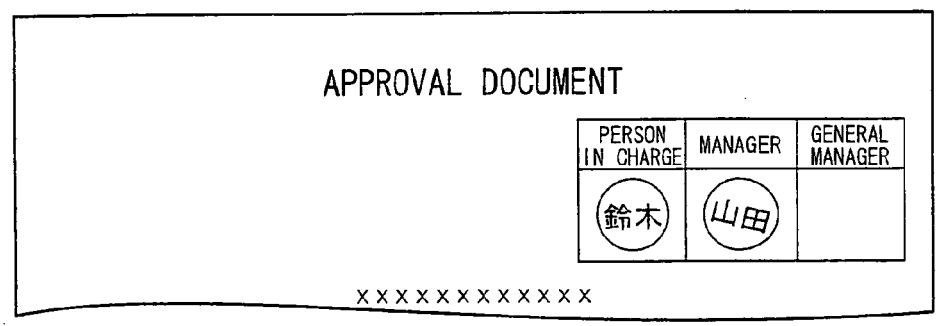
Figure 6:
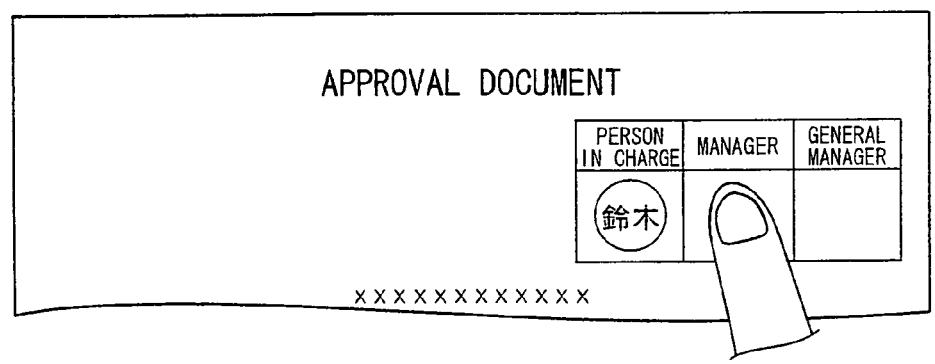
Figure 6:
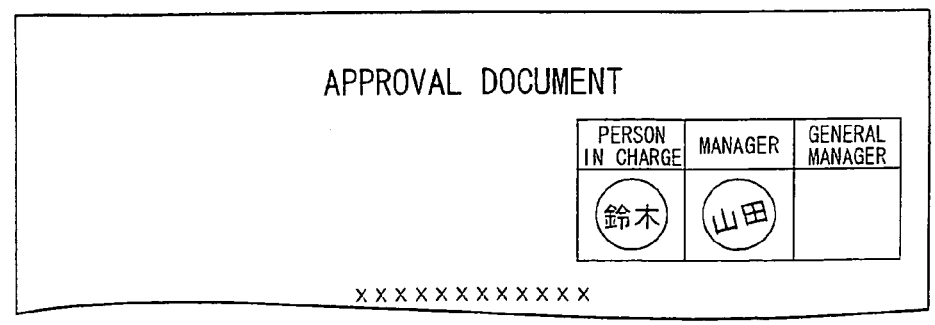

The controlling section 12 may function as a rotation sealing section that performs a rotation process of rotating a seal image read out from the storage section 11 and sealing the seal image onto an approval document, although this is not described in the embodiment above. In this case, the controlling section 12 may alter a rotation angle of the rotation process, according to the direction in which a digit indicated on a subject image is directed. This makes it possible to reflect a user's manner of sealing to an angle of a seal image to be sealed onto an approval document. This makes it possible to, for example, (i) seal a seal image slanting to the right as illustrated in FIG. 6(b) when a user places a digit slanting to the right on a display panel as illustrated in FIG. 6(a) and (ii) seal a seal image slanting to the left as illustrated in FIG. 6(d) when a user places a digit slanting to the left on a display panel as illustrated in FIG. 6(c).

The storage section 11 may store (i) the first fingerprint information to be used to identify a fingerprint of a middle finger (the first digit) of a user's right hand and (ii) the first seal image of the user in association with each other, and (iii) third fingerprint information to be used to identify a fingerprint of a thumb (a third digit) of the user's right hand and (iv) a second seal image (a seal image which is different from the first seal image) of the user in association with each other, although this is not described in the embodiment above. In this case, the controlling section 12 has a function as a digit identifying section 12c that (i) determines based on the first fingerprint information whether or not a fingerprint in a subject image is the fingerprint of the middle finger of the right hand, and (ii) determines based on the third fingerprint information whether or not the fingerprint in the subject image is the fingerprint of the thumb of the right hand. In addition, the controlling section 12 has a function as the sealing section 12d that (i) seals onto an approval document, in a case where the fingerprint indicated on the subject image is determined to be the fingerprint of the middle finger of the right hand, the first seal image associated with the first fingerprint information, and (ii) seals onto the approval document, in a case where the fingerprint indicated on the subject image is determined to be the fingerprint of the thumb of the right hand, the second seal image associated with the third fingerprint information. According to the arrangement, by merely switching digits (a middle finger/a thumb of a right hand) to be placed on the display screen of the image displaying/reading apparatus 2a, a user can select a seal image (the first seal image/the second seal image) to be sealed onto an electronic document. For example, this makes it possible to seal an unregistered seal when a middle finger is placed on a display screen and seal a registered seal when a thumb is placed on the display screen.

The controlling section 12 may have a function as a preview controlling section that causes the image displaying/reading apparatus 2a to display a preview of the first seal image in a case where a fingerprint indicated on a subject image is determined to be a fingerprint of a middle finger of a user's right hand, and causes the image displaying/reading apparatus 2a to display a preview of the second seal image in a case where the fingerprint in the subject image is determined to be a fingerprint of a thumb of the user's right hand. In this case, the controlling section 12 causes the image displaying/reading apparatus 2a to continue to display the preview of the first seal image while the subject image indicates the fingerprint of the middle finger of the user's right hand. The controlling section 12 halts the image displaying/reading apparatus 2a from displaying the preview of the first seal image while the subject image does not indicate the fingerprint of the middle finger of the user's right hand. Likewise, the controlling section 12 causes the image displaying/reading apparatus 2a to continue to display the preview of the second seal image while the subject image indicates the fingerprint of the thumb of the user's right hand. The controlling section 12 halts the image displaying/reading apparatus 2a from displaying the preview of the second seal image while the subject image does not indicate the fingerprint of the thumb of the user's right hand. The controlling section 12 performs control in such a way that the first seal image is sealed onto an approval document in a case where the preview of the first seal image is displayed for a predetermined period of time, and the second seal image is sealed onto an approval document in a case where the preview of the second seal image is displayed for a predetermined period of time. According to the arrangement, a user can make sure before sealing a seal image "which seal image is sealed by placing which digit on the display screen." This makes it possible to prevent a mischoice of a seal image.

According to the electronic seal system 10 of the present embodiment, an approval document prepared by a person in charge (i.e., an originator of the approval document) is forwarded to the terminal 3 for a manager (S22), and then, forwarded to the terminal 4 for a general manager. The controlling section 12 may send an email indicating a recipient of the approval document to the terminal 2 for a person in charge (the originator) every time the approval document is forwarded. This allows a person in charge to always know who has the approval document prepared by the person in charge.

In the present embodiment, a fingerprint indicated on a subject image is compared with the first fingerprint information, the second fingerprint information, and the third fingerprint information, which are stored in the storage section 11 in advance. What is compared is not limited to a fingerprint, but may be anything as long as a user's digit is identified. For example, an arrangement may be such that vein information indicative of a vein pattern of a user's digit is stored in the storage section 11 in advance and a vein pattern of a user's digit which is indicated on a subject image is compared with the vein information. Alternatively, an arrangement may be such that hand shape information indicative of a shape of a user's digit is stored in the storage section 11 in advance and a shape of a user's digit which is indicated on a subject image is compared with the hand shape information. That is, the controlling section 12 is not limited to an embodiment in which a fingerprint is compared, provided that the controlling section 12 has a function as a digit identifying section that determines based on identification information (i.e., fingerprint information in the present embodiment) to be used for identifying a user's digit whether or not a digit (or a part of the digit) indicated on a subject image matches with a digit of a user.

In the present description, to "seal" means sealing a so-called electronic seal. The sealing an electronic seal further means a process of adding a seal image onto an electronic document. The seal image to be sealed in the sealing encompasses an image of a user's signature.

In the present embodiment, a ROM and/or an external or internal hard disk drive can be used as the storage section 11 in the administrative server 1. The storage section 11 does not have to be provided inside the administrative server 1, provided that the controlling section 12 in the administrative server 1 has access to the storage section 11. For example, the storage section 11 may be provided inside any one of the terminals 2 thorough 4 to which the controlling section 12 has access. Alternatively, the storage section 11 may be a hard disk drive that is directly connected to the communications network 5.

The controlling section 12 in the administrative server 1 is realized by a PC-based computer (a combination of a CPU, a RAM, a ROM, etc.). Processes to be carried out by the controlling section 12 are carried out by executing a program on the computer. The program may be stored in a removable medium (a computer-readable storage medium) such as a CD-ROM and read out therefrom to be executed. Alternatively, the program may be installed on a hard disk etc. and read out therefrom to be executed. In a case where the controlling section 12 is connected to a communications network such as the Internet, it is possible to present an arrangement in which the program is downloaded via the communications network and installed on a hard disk etc. to be executed.

The electronic seal system of the present embodiment is suitable for a computer on which a seal image is added to an electronic document displayed on a display panel.

The administrative server (the electronic seal apparatus) of the present embodiment includes: a controlling section for (i) controlling an image displaying/reading apparatus having a function of displaying an image on a display panel by using display elements arrayed in a plane direction and a function of reading, by using reading elements arrayed in a plane direction, a subject image of a subject being placed in contact with the display panel, and (ii) sealing a seal image onto an electronic document displayed on the display panel; and a storage section for storing (i) first identification information to be used for identifying a first digit of a user of the image displaying/reading apparatus and (ii) a first seal image of the user in association with the first identification information, the controlling section including: a digit identifying section for determining based on the first identification information whether or not a digit indicated on the subject image that is read while the electronic document is displayed is the first digit; and a sealing section for sealing, in a case where the digit identifying section determines that the digit indicated on the subject image is the first digit, the first seal image onto the electronic document displayed on the display panel, the first seal image being associated with the first identification information.

According to the arrangement of the present embodiment, information indicative of a user's digit (a fingerprint image, a vein pattern image, etc.) can be inputted from the image displaying/reading apparatus. This makes it possible to electronically seal a seal image after finger authentication is performed even if a finger authentication scanner solely dedicated for reading an image from a digit is not provided.

In the present embodiment, the controlling section may include a position acquisition section for acquiring, based on the subject image, position information indicative of a position where the first digit is placed on the electronic document displayed on the display panel; and the sealing section seals the first seal image in that position, on the electronic document displayed on the display panel, which is indicated by the position information. With the arrangement, by placing on the display panel the user's first digit, the first seal image is sealed in a contact (facing) point between the electronic document displayed on the display panel and the first digit. Accordingly, both inputting of digit information (a fingerprint etc.) indicative of features of a digit and designation of a sealing position are simultaneously performed by placing the digit on the display panel. As a result, a user can simultaneously perform inputting of digit information and designation of a sealing position, in a system that does not permit a user to electronically seal a seal image without inputting of digit information. That is, the arrangement of the present embodiment saves more labor as compared to an electronic seal system in which inputting of a fingerprint is performed by placing a digit on a reading surface of a scanner solely dedicated for biometric authentication and designation of a sealing position is performed by operating a keyboard (or a mouse).

In the present embodiment, the electronic document may have a seal field. According to the arrangement, a user can easily recognize where to place a digit on a display panel in order to electronically seal a seal image.

In the present embodiment, the controlling section may include a position determination section for determining whether or not a position of the seal field matches with the position indicated by the position information; and, in a case where the digit identifying section determines that the digit indicated on the subject image is the first digit, and the position determination section determines that the position of the seal field matches with the position indicated by the position information, the sealing section may seal the first seal image in that position on the electronic document displayed on the display panel which is indicated by the position information. According to the arrangement, a seal image is always sealed within a seal field. This eliminates an undesired situation in which a seal image is sealed outside a seal field.

In the present embodiment, the controlling section may include an error notifying section that gives a notice to the user in a case where the position determination section determines that the position of the seal field does not match with the position indicated by the position information, the notice notifying that the position of the first digit is incorrect. According to the arrangement, it is possible to notify a user placing a digit on a position outside a seal field on an electronic document displayed on a display panel that a seal image is not sealed because the digit is placed on an incorrect position.

In the present embodiment, an arrangement may be such that: the electronic document has a specific seal field for a user of a specific group; the storage section stores (i) the first identification information, (ii) the first seal image, and (iii) group information so that the first seal image and the group information are associated with the first identification information, the group information being indicative of a group to which the user belongs; the controlling section includes a group determination section that performs group determination in a case where the digit identifying section determines that the digit indicated on the subject image is the first digit, the group determination determining whether or not the user belongs to the specific group, based on the group information associated with the first identification information; in a case where the group determination section determines that the user belongs to the specific group, the position determination section determines whether or not a position of the specific seal field matches with the position indicated by the position information; and, in a case where (i) the digit identifying section determines that the digit indicated on the subject image is the first digit; (ii) the group determination section determines that the user belongs to the specific group; and (iii) the position determination section determines that the position of the specific seal field matches with the position indicated by the position information, the sealing section seals the first seal image in that position on the electronic document displayed on the display panel which is indicated by the position information. According to the arrangement, only a seal image of a user of a specific group is sealed in a specific seal field for a user of the specific group. This prevents an undesired situation in which a seal image of a person who does not belong to a specific group is sealed by mistake in a specific seal field.

In the present embodiment, the controlling section may include a warning section for notifying the user of a warning in a case where the group determination section determines that the user does not belong to the specific group and the position determination section determines that the position of the specific seal field matches with the position indicated by the position information. According to the arrangement, for example, in a case where, a user who does not belong to a specific group places a digit on a specific seal field, it is possible to notify the user that a seal image cannot be sealed in the specific seal field because the user does not belong to the specific group.

In the present embodiment, an arrangement may be such that: the specific seal field encompasses a first specific seal field for a user of a first specific group and a second specific seal field for a user of a second specific group; and the controlling section includes a sealing prohibition section for prohibiting the sealing section from sealing a seal image in the second specific seal field until a seal image is sealed in the first specific seal field. According to the arrangement, it is possible to set an order in which users seal respective seal images. In a case where, for example, the electronic document is an approval document in an organization, this makes it possible to avoid an undesired situation in which an upper-level worker seals by mistake his seal image onto the approval document before a lower-level worker seals his seal image onto the approval document. (In decision making based on an approval document inside an organization, generally, an upper-level worker seals his seal image onto an approval document after a lower-level worker seals his seal image thereon.)

In the present embodiment, an arrangement may be such that: the controlling section controls a plurality of image displaying/reading apparatuses; the plurality of image displaying/reading apparatuses encompass a first image displaying/reading apparatus for the user of the first specific group and a second image displaying/reading apparatus for the user of the second specific group; the controlling section includes a display controlling section; and after the first seal image is sealed in the first specific seal field on an electronic document displayed on a display panel of the first image displaying/reading apparatus, the display controlling section starts to display on a display panel of the second image displaying/reading apparatus the electronic document having the first seal image sealed in the first specific seal field. This makes it possible to display an electronic document to each of users in a predetermined order in which each of the users seals his seal image.

In the present embodiment, an arrangement may be such that: the storage section stores second identification information to be used for identifying a second digit of the user having the first digit; the digit identifying section determines based on the second identification information whether or not the digit indicated on the subject image that is read while the electronic document is displayed is the second digit; and the controlling section includes a disapproval notifying section that gives a notice to an originator of the electronic document in a case where the digit identifying section determines that the digit indicated on the subject image is the second digit, the notice notifying that the electronic document is disapproved. According to the arrangement, by merely switching digits (the first digit/the second digit) to be placed on a display panel of an image displaying/reading apparatus, a person (a user) who gives approval or disapproval can switch between entering of a sealing execution command for giving approval and entering of an execution command of a disapproval notification process. As a result, it is possible to save more labor as compared to an arrangement that requires a user to operate a keyboard to enter these commands.

In the present embodiment, the sealing section may have a function of rotating the first seal image and then sealing the rotated first seal image onto the electronic document; and a rotation angle of the rotation may be altered according to a direction in which the digit indicated on the subject image is directed. According to the arrangement, it is possible to reflect a user's manner of sealing to an angle of the first seal image to be sealed onto an approval document. For example, this makes it possible to (i) seal a seal image slanting to the right when a user places a digit slanting to the right on a display panel and (ii) seal a seal image slanting to the left when a user places a digit slanting to the left on a display panel.

In the present embodiment, an arrangement may be such that: the storage section stores third identification information to be used for identifying a third digit of the user having the first digit and a second seal image of the user in association with the third identification information; the digit identifying section determines based on the third identification information whether or not the digit indicated on the subject image that is read while the electronic document is displayed is the third digit; and, in a case where the digit identifying section determines that the digit indicated on the subject image is the third digit, the sealing section seals onto the electronic document displayed on the display panel the second seal image associated with the third identification information. According to the arrangement, by merely switching digits (the first digit/the third digit) to be placed on a display panel of an image displaying/reading apparatus, a user can select a seal image (the first seal image/the second seal image) to be sealed onto an electronic document. For example, this makes it possible to seal an unregistered seal when a middle finger is placed on a display screen and seal a registered seal when a thumb is placed on the display screen.

In the present embodiment, an arrangement may be such that: the controlling section includes a preview controlling section; in a case where the digit identifying section determines that the digit indicated on the subject image is the first digit, the preview controlling section causes the image displaying/reading apparatus to display a preview of the first seal image; in a case where the digit identifying section determines that the digit indicated on the subject image is the third digit, the preview controlling section causes the image displaying/reading apparatus to display a preview of the second seal image; the preview controlling section controls the image displaying/reading apparatus so that the image displaying/reading apparatus (i) continues to display the preview of the first seal image while the first digit is indicated on the subject image, (ii) stops displaying the preview of the first seal image while the first digit is not indicated on the subject image, (iii) continues to display the preview of the second seal image while the third digit is indicated on the subject image, and (iv) stops displaying the preview of the second seal image while the third digit is not indicated on the subject image; and the sealing section seals (i) the first seal image onto the electronic document in a case where the preview of the first seal image continues to be displayed for a predetermined period of time or longer, or (ii) the second seal image onto the electronic document in a case where the preview of the second seal image continues to be displayed for a predetermined period of time or longer. According to the arrangement, a user can make sure before sealing a seal image "which seal image is sealed by placing which digit on the display screen." This makes it possible to prevent a mischoice of a seal image.

The electronic seal system of the present embodiment includes the electronic seal apparatus and the image displaying/reading apparatus. Further, the present embodiment is a method for controlling an electronic seal apparatus that seals a seal image onto an electronic document, the method including: the steps, implemented by a control section of the electronic seal apparatus, of: operating an image displaying/reading apparatus to display the electronic document, the image displaying/reading apparatus having a function of displaying an image on a display panel by using display elements arrayed in a plane direction and a function of reading as a subject image by using reading elements arrayed in a plane direction an image of a subject being in contact with the display panel; referring to a storage section storing first identification information to be used for identifying a first digit of a user of the image displaying/reading apparatus and a first seal image of the user in association with the first identification information, to determine, based on the first identification information, whether or not a digit indicated on the subject image that is read while the electronic document is displayed is the first digit; and, in a case where the digit indicated on the subject image is the first digit, operating the electronic seal apparatus to seal the first seal image, onto the electronic document displayed on the display panel, the first seal image being associated with the first identification information.

The scope of the present invention encompasses a sealing program for causing the controlling section to carry out the steps, and a computer-readable storage medium storing the sealing program.

The present invention is not limited to the description of the embodiments above, but may be altered by a skilled person within the scope of the claims. An embodiment based on a proper combination of technical means disclosed in different embodiments is encompassed in the technical scope of the present invention.

The embodiments and concrete examples of implementation discussed in the foregoing detailed explanation serve solely to illustrate the technical details of the present invention, which should not be narrowly interpreted within the limits of such embodiments and concrete examples, but rather may be applied in many variations within the spirit of the present invention, provided such variations do not exceed the scope of the patent claims set forth below.

What is claimed is:

1. An electronic seal apparatus comprising:
a controlling section for (i) controlling an image displaying/reading apparatus having a function of displaying an image on a display panel by using display elements arrayed in a plane direction and a function of reading, by using reading elements arrayed in a plane direction, a subject image of a subject being placed in contact with the display panel, and (ii) sealing a seal image onto an electronic document displayed on the display panel; and
a storage section for storing (i) first identification information to be used for identifying a first digit of a user of the image displaying/reading apparatus and (ii) a first seal image of the user in association with the first identification information,
the controlling section including:
a digit identifying section for determining based on the first identification information whether or not a digit indicated on the subject image that is read while the electronic document is displayed is the first digit; and
a sealing section for sealing, in a case where the digit identifying section determines that the digit indicated on the subject image is the first digit, the first seal image onto the electronic document displayed on the display panel, the first seal image being associated with the first identification information.

2. The electronic seal apparatus as set forth in claim 1, wherein:
the controlling section includes a position acquisition section for acquiring, based on the subject image, position information indicative of a position where the first digit is placed on the electronic document displayed on the display panel; and
the sealing section seals the first seal image in that position, on the electronic document displayed on the display panel, which is indicated by the position information.

3. The electronic seal apparatus as set forth in claim 2, wherein the electronic document has a seal field.

4. The electronic seal apparatus as set forth in claim 3, wherein:
the controlling section includes a position determination section for determining whether or not a position of the seal field matches with the position indicated by the position information; and
in a case where the digit identifying section determines that the digit indicated on the subject image is the first digit, and the position determination section determines that the position of the seal field matches with the position indicated by the position information, the sealing section seals the first seal image in that position on the electronic document displayed on the display panel which is indicated by the position information.

5. The electronic seal apparatus as set forth in claim 4, wherein
the controlling section includes an error notifying section that gives a notice to the user in a case where the position determination section determines that the position of the seal field does not match with the position indicated by the position information, the notice notifying that the position of the first digit is incorrect.

6. The electronic seal apparatus as set forth in claim 4, wherein:
the electronic document has a specific seal field for a user of a specific group;
the storage section stores (i) the first identification information, (ii) the first seal image, and (iii) group information so that the first seal image and the group information are associated with the first identification information, the group information being indicative of a group to which the user belongs;
the controlling section includes a group determination section that performs group determination in a case where the digit identifying section determines that the digit indicated on the subject image is the first digit, the group determination determining whether or not the user belongs to the specific group, based on the group information associated with the first identification information;
in a case where the group determination section determines that the user belongs to the specific group, the position determination section determines whether or not a position of the specific seal field matches with the position indicated by the position information; and
in a case where (i) the digit identifying section determines that the digit indicated on the subject image is the first digit; (ii) the group determination section determines that the user belongs to the specific group; and (iii) the position determination section determines that the position of the specific seal field matches with the position indicated by the position information, the sealing section seals the first seal image in that position on the electronic document displayed on the display panel which is indicated by the position information.

7. The electronic seal apparatus as set forth in claim 6, wherein
the controlling section includes a warning section for notifying the user of a warning in a case where the group determination section determines that the user does not belong to the specific group and the position determination section determines that the position of the specific seal field matches with the position indicated by the position information.

8. The electronic seal apparatus as set forth in claim 6, wherein:
the specific seal field encompasses a first specific seal field for a user of a first specific group and a second specific seal field for a user of a second specific group; and
the controlling section includes a sealing prohibition section for prohibiting the sealing section from sealing a seal image in the second specific seal field until a seal image is sealed in the first specific seal field.

9. The electronic seal apparatus as set forth in claim 8, wherein
the controlling section controls a plurality of image displaying/reading apparatuses;
the plurality of image displaying/reading apparatuses encompass a first image displaying/reading apparatus for the user of the first specific group and a second image displaying/reading apparatus for the user of the second specific group;
the controlling section includes a display controlling section; and
after the first seal image is sealed in the first specific seal field on an electronic document displayed on a display panel of the first image displaying/reading apparatus, the display controlling section starts to display on a display panel of the second image displaying/reading apparatus the electronic document having the first seal image sealed in the first specific seal field.

10. The electronic seal apparatus as set forth in claim 1, wherein:

the storage section stores second identification information to be used for identifying a second digit of the user having the first digit;

the digit identifying section determines based on the second identification information whether or not the digit indicated on the subject image that is read while the electronic document is displayed is the second digit; and the controlling section includes a disapproval notifying section that gives a notice to an originator of the electronic document in a case where the digit identifying section determines that the digit indicated on the subject image is the second digit, the notice notifying that the electronic document is disapproved.

11. The electronic seal apparatus as set forth in claim 1, wherein:

the sealing section has a function of rotating the first seal image and then sealing the rotated first seal image onto the electronic document; and a rotation angle of the rotation is altered according to a direction in which the digit indicated on the subject image is directed.

12. The electronic seal apparatus as set forth in claim 1, wherein:

the storage section stores third identification information to be used for identifying a third digit of the user having the first digit and a second seal image of the user in association with the third identification information;

the digit identifying section determines based on the third identification information whether or not the digit indicated on the subject image that is read while the electronic document is displayed is the third digit; and in a case where the digit identifying section determines that the digit indicated on the subject image is the third digit, the sealing section seals onto the electronic document displayed on the display panel the second seal image associated with the third identification information.

13. The electronic seal apparatus as set forth in claim 12, wherein:

the controlling section includes a preview controlling section;

in a case where the digit identifying section determines that the digit indicated on the subject image is the first digit, the preview controlling section causes the image displaying/reading apparatus to display a preview of the first seal image;

in a case where the digit identifying section determines that the digit indicated on the subject image is the third digit, the preview controlling section causes the image displaying/reading apparatus to display a preview of the second seal image;

the preview controlling section controls the image displaying/reading apparatus so that the image displaying/reading apparatus (i) continues to display the preview of the first seal image while the first digit is indicated on the subject image, (ii) stops displaying the preview of the first seal image while the first digit is not indicated on the subject image, (iii) continues to display the preview of the second seal image while the third digit is indicated on the subject image, and (iv) stops displaying the preview of the second seal image while the third digit is not indicated on the subject image; and the sealing section seals (i) the first seal image onto the electronic document in a case where the preview of the first seal image continues to be displayed for a predetermined period of time or longer, or (ii) the second seal image onto the electronic document in a case where the preview of the second seal image continues to be displayed for a predetermined period of time or longer.

14. An electronic seal system comprising an image displaying/reading apparatus having a function of displaying an image on a display panel by using display elements arrayed in a plane direction and a function of reading as a subject image by using reading elements arrayed in a plane direction an image of a subject being in contact with the display panel; and an electronic seal apparatus for controlling the image displaying/reading apparatus and sealing a seal image onto an electronic document displayed on the display panel, the electronic seal apparatus including:

a storage section for storing (i) first identification information to be used for identifying a first digit of a user of the image displaying/reading apparatus and (ii) a first seal image of the user in association with the first identification information;

a digit identifying section for determining based on the first identification information whether or not a digit indicated on the subject image that is read while the electronic document is displayed is the first digit; and a sealing section for sealing, in a case where the digit identifying section determines that the digit indicated on the subject image is the first digit, onto the electronic document displayed on the display panel the first seal image associated with the first identification information.

15. A method for controlling an electronic seal apparatus that seals a seal image onto an electronic document, the method comprising: the steps, implemented by a control section of the electronic seal apparatus, of:

operating an image displaying/reading apparatus to display the electronic document, the image displaying/reading apparatus having a function of displaying an image on a display panel by using display elements arrayed in a plane direction and a function of reading as a subject image by using reading elements arrayed in a plane direction an image of a subject being in contact with the display panel;

referring to a storage section storing first identification information to be used for identifying a first digit of a user of the image displaying/reading apparatus and a first seal image of the user in association with the first identification information, to determine, based on the first identification information, whether or not a digit indicated on the subject image that is read while the electronic document is displayed is the first digit; and in a case where the digit indicated on the subject image is the first digit, operating the electronic seal apparatus to seal the first seal image, onto the electronic document displayed on the display panel, the first seal image being associated with the first identification information.

* * * * *